(12) United States Patent
Park

(10) Patent No.: US 7,086,076 B1
(45) Date of Patent: Aug. 1, 2006

(54) METHOD FOR CHANGING CHANNEL INFORMATION IN DIGITAL TV RECEIVER

(75) Inventor: Yong-Seok Park, Taegu-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/310,091

(22) Filed: May 12, 1999

(30) Foreign Application Priority Data

May 15, 1998 (KR) .................................. 98-17614

(51) Int. Cl.
*H04N 5/445* (2006.01)

(52) U.S. Cl. .................... 725/50; 725/132; 725/140; 725/152; 348/569; 348/731

(58) Field of Classification Search ........ 725/131–134, 725/151–153, 139–142, 39–55, 68–72; 348/569, 348/570, 906, 731–732
See application file for complete search history.

(56) References Cited

U.S. PATENT DOCUMENTS

| | | | | |
|---|---|---|---|---|
| 5,473,609 A | * | 12/1995 | Chaney | 370/312 |
| 5,585,866 A | * | 12/1996 | Miller et al. | 725/43 |
| 5,592,551 A | * | 1/1997 | Lett et al. | 380/211 |
| 5,699,125 A | * | 12/1997 | Rzeszewski et al. | 725/50 |
| 5,734,589 A | * | 3/1998 | Kostreski et al. | 715/716 |
| 5,828,419 A | * | 10/1998 | Bruette et al. | 725/28 |
| 5,841,433 A | * | 11/1998 | Chaney | 345/327 |
| 5,864,358 A | * | 1/1999 | Suzuki et al. | 725/142 |
| 5,880,768 A | * | 3/1999 | Lemmons et al. | 725/41 |
| 5,917,481 A | * | 6/1999 | Rzeszewski et al. | 715/721 |
| 6,014,184 A | * | 1/2000 | Knee et al. | 725/45 |
| 6,118,498 A | * | 9/2000 | Reitmeier | 348/725 |
| 6,209,131 B1 | * | 3/2001 | Kim et al. | 725/50 |
| 6,249,320 B1 | * | 6/2001 | Schneidewend et al. | 348/569 |
| 6,252,907 B1 | * | 6/2001 | Hwang | 375/240.25 |
| 6,263,502 B1 | * | 7/2001 | Morrison et al. | 725/47 |
| 6,286,140 B1 | * | 9/2001 | Ivanyi | 725/14 |
| 6,343,379 B1 | * | 1/2002 | Ozawa et al. | 725/63 |
| 6,357,046 B1 | * | 3/2002 | Thompson et al. | 725/139 |
| 6,366,731 B1 | * | 4/2002 | Na et al. | 386/83 |
| 6,401,242 B1 | * | 6/2002 | Eyer et al. | 725/35 |
| 6,405,372 B1 | * | 6/2002 | Kim et al. | 725/50 |
| 6,606,748 B1 | * | 8/2003 | Tomioka et al. | 725/50 |
| 6,928,653 B1 | * | 8/2005 | Ellis et al. | 725/50 |
| 2001/0052856 A1 | * | 12/2001 | Deniau et al. | |

OTHER PUBLICATIONS

ETSI, Digital broadcasting system for television, sound and data services, Specification for Service Information (SI) in Digital Video Broadcasting (DVB) systems.*

* cited by examiner

*Primary Examiner*—Chris Kelley
*Assistant Examiner*—Annan Q. Shang
(74) *Attorney, Agent, or Firm*—Fleshner & Kim, LLP

(57) ABSTRACT

Method for changing channel information in a digital TV receiver which can deal with a channel cancellation/addition during broadcasting, including the steps of (1) determining a channel information of being changed from a broadcasting signal received at every preset time interval and storing the changed channel information, and (2) comparing the stored changed channel information and channel information stored already, for updating the channel information.

29 Claims, 9 Drawing Sheets

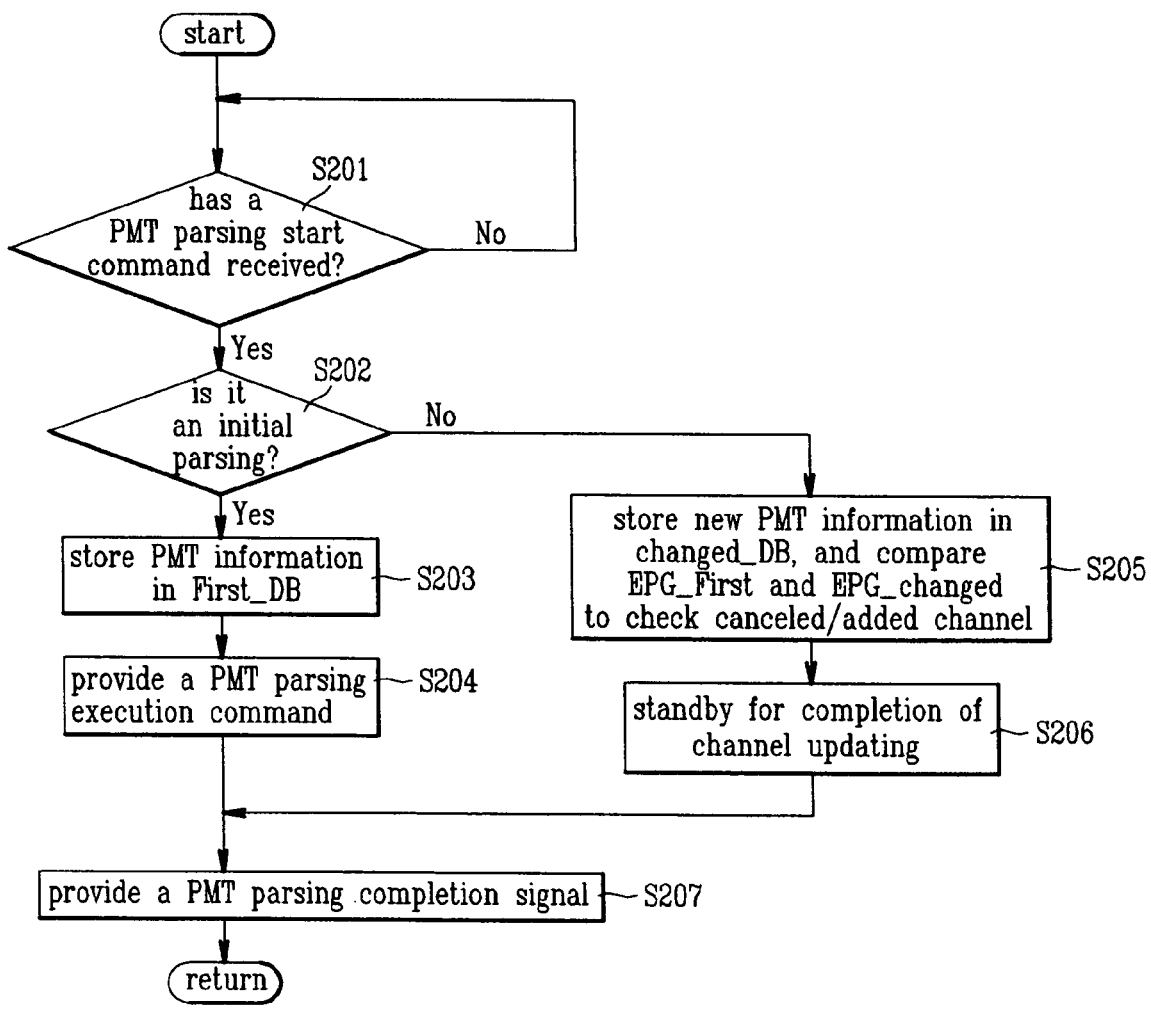

FIG.7

```
PROGRAM *progCur *buf_progCut;

progCur =EPG_First-> progSt; /*designate a start channel in EPG_First as progCur */
while( progCur !=NULL ) { /* check channel cancel*/
    buf_progCur = EPG_Changed->progSt; /* designate a start channel in EPG_Channel as buf_progCur */
    while( buf_progCur != NULL ) {
        if( progCur->progNum == buf_progCur->progNum )
            break; /* no channel information change */
        buf_progCur = buf_progCur->progNext;
    }
    if(buf_progCur == NULL)
        Del_Ch[progCur->ch_no] = 1; /* setting canceled channel to '1' */
    progCur = progCur->progNext;
} buf_progCur = EPG_Changed->progSt; /* designate a start channel in EPG_Changed as buf_progCur */
while( buf_progCur !=NULL ) { /* check addition of channel */
    progCur = EPG_First->progSt; /* designate a start channel in EPG_First as progCur */
    while(progCur != NULL) {
        if( buf_progCur->progNum == progCur->progNum )
            break; /* no channel information change */
        progCur = progCur->progNext;
    }
    if(progCur == NULL)
        In_Ch[buf_progCur->ch_no] = 1; /*check addition of channel*/
    buf_progCur = buf_progCur->progNext;
}

Ver_Ch_pat_pmt = TRUE;
/* a FLAG informing to a key handling process that channel
   cancellation and addition checks are finished */
```

FIG.8

```
switch( key )
{
   case HOT_KEY and channel UP, DOWN KEY:
      /* taking action required by a key input */
      break;

default: /* a motion picture without key input */
      if(Ver_Ch_pat_pmt && !evt_del_mode && !Del_Ch[curProg->ch_no] && !EIT_ON)
      { /* re-anrange DB when 4 conditions are satisfied */ disconnect connection to a canceled channel and connect to an added channel;

SemSignal(done_update_ch);
         /* as channel information updated, teturn to version chack process */
      }
      break;
}
```

METHOD FOR CHANGING CHANNEL INFORMATION IN DIGITAL TV RECEIVER

BACKGROUND OF THE INVENTION

1. Field of the Invention

The present invention relates to a digital TV receiver, and more particularly, to a method for changing channel information in a digital TV receiver.

2. Background of the Related Art

Recently, keeping pace with development on TV technologies, there has been growing interests in digital TV receivers having a digital transmission system applied thereto, and, in a domestic case, the Mugungwha satellite was launched and started digital test broadcasting in July '96. In general, a time multiplexed signal of video, audio and program specific information signals intended to transmit in a digital satellite broadcasting is called as a transport stream (TS), which is QPSK modulated before transmission to respective receivers through a satellite.

Referring to FIG. 1, in detail, the information multiplexed to TS has an elementary stream of which main purpose is broadcasting, and a RSMS(Resource & Subscriber Management System) stream, a program specific information. The elementary stream is inclusive of video information, and audio information the same as the analog broadcasting, and data additional in a case of the digital broadcasting. The RSMS stream has SI(Service Information) and RSMS message, of which RSMS message is transmitted in a case when a conditional access function is used, and the SI has PSI (Program Specific Information) which allows a receiver to demultiplex the TS and PMM(Program Guide Message). The PSI, which is an objective of the present invention, has PAT(Program Association Table), PMT(Program Map Table) and CAT (Conditional Access Table).

FIG. 2 illustrates a PSI table, wherein the PAT provides PIDs(Packet IDs) of the PMT connecting program numbers which is information on a service stream provided presently, i.e., information on assignment of channels to repeaters to the elementary stream having video and audio information for each program number, and PIDs of the PMM and the RCM in the RSMS stream. The PMT provides a program definition by connecting the program number to one set of elementary stream. One section of the PMT defines one program.

The PAT and PMT have architectures as shown in FIGS. 3a and 3b respectively. The PAT has a data pattern inclusive of a version number which is increased as a number of PMT sections is increased and decreased as the number of PMT sections is decreased, i.e., broadcasting channel changes in correspondence to the PMT section. A related art digital TV receiver conducts PAT and PMT parsing only when an initial power is turned on for re-setting channel information and, maintains broadcasting channel information set initially until turning on after turning off the power. Because the related art digital TV receiver maintains a channel set at initial power supply as it is during watching a broadcasting, the related art digital TV receiver has a problem in that a channel having no display of video can not be canceled or a channel added newly can not be displayed even if channel information is changed due to channel cancellation/addition during broadcasting, that gives inconvenience to users.

SUMMARY OF THE INVENTION

Accordingly, the present invention is directed to a method for changing channel information in a digital TV receiver that substantially obviates one or more of the problems due to limitations and disadvantages of the related art.

An object of the present invention is to provide a method for changing channel information in a digital TV receiver which can deal with a channel cancellation/addition during broadcasting.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for changing channel information in a digital TV receiver includes the steps of (1) determining a channel information of being changed from a broadcasting signal received at every preset time interval and storing the changed channel information, and (2) comparing the stored changed channel information and channel information stored already, for updating the channel information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 5 illustrates flow chart showing the steps of a method for parsing a PMT in changing channel information in a digital TV receiver in accordance with a preferred embodiment of the present invention;

FIG. 7 illustrates an embodiment of algorithm for conducting the checking of canceled/added channel in FIG. 5; and, FIG. 8 illustrates an embodiment of algorithm for adjusting the channel list in FIG. 6a.

DETAILED DESCRIPTION OF THE PREFERRED EMBODIMENT

Figure 1:
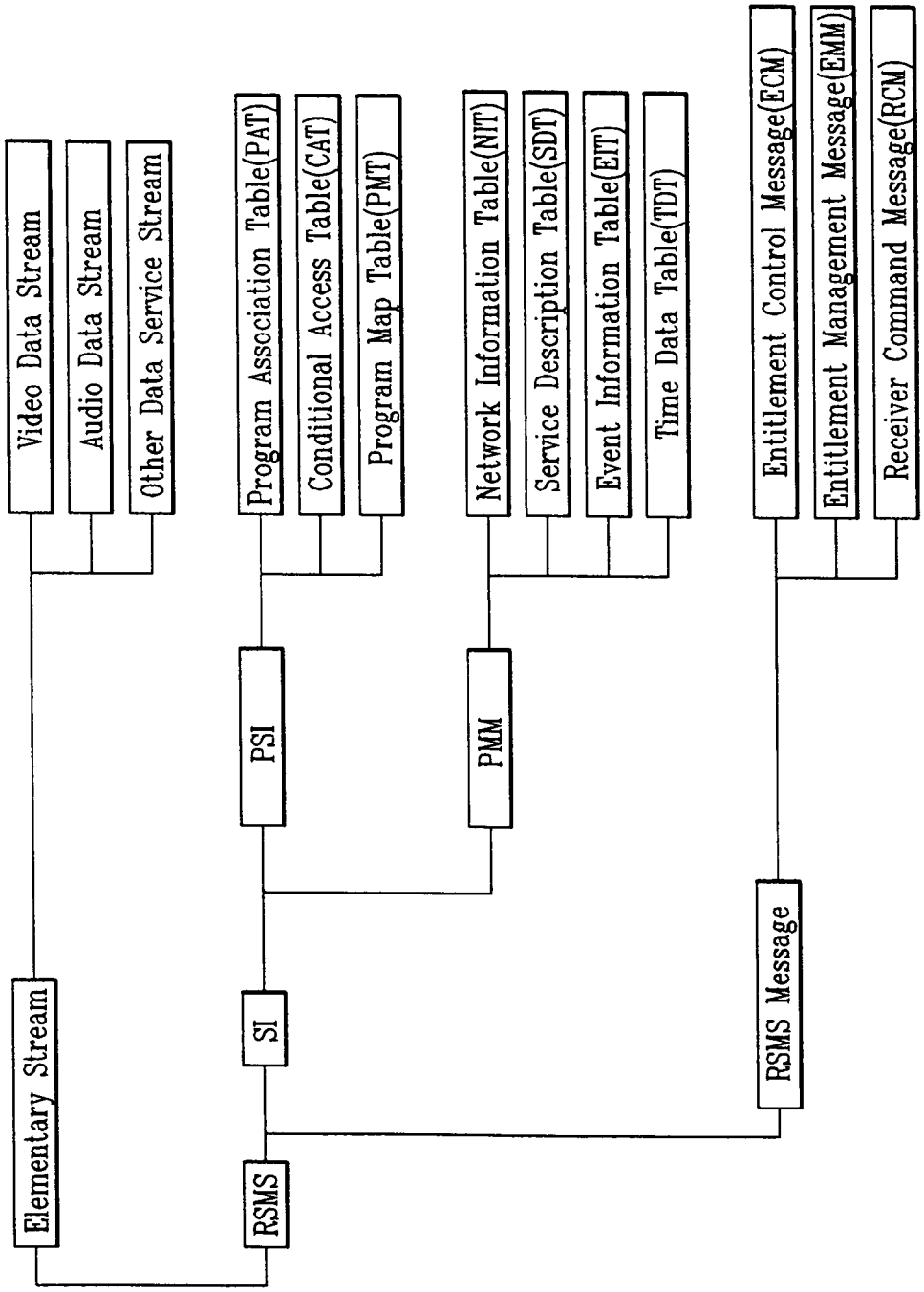
FIG. 1 illustrates an architecture of a related art transport stream.
Figure 2:
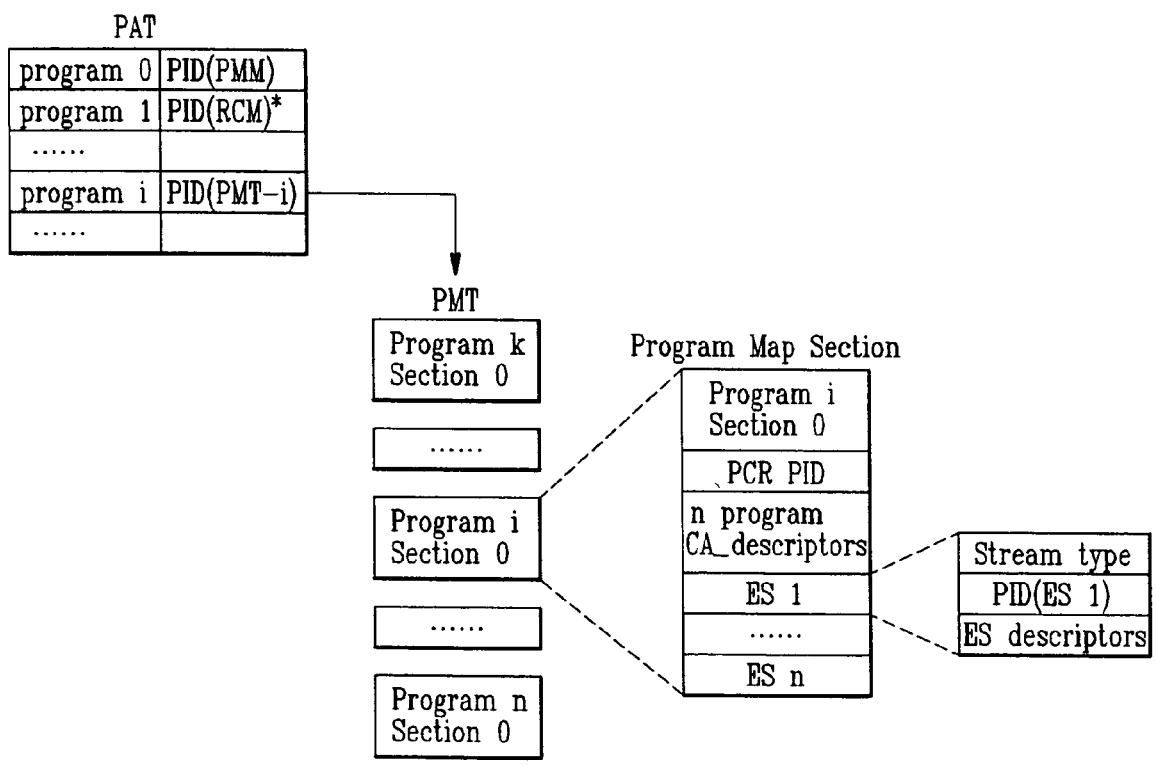
FIG. 2 illustrate an architecture of the PSI table in FIG. 1.
Figure 3A:
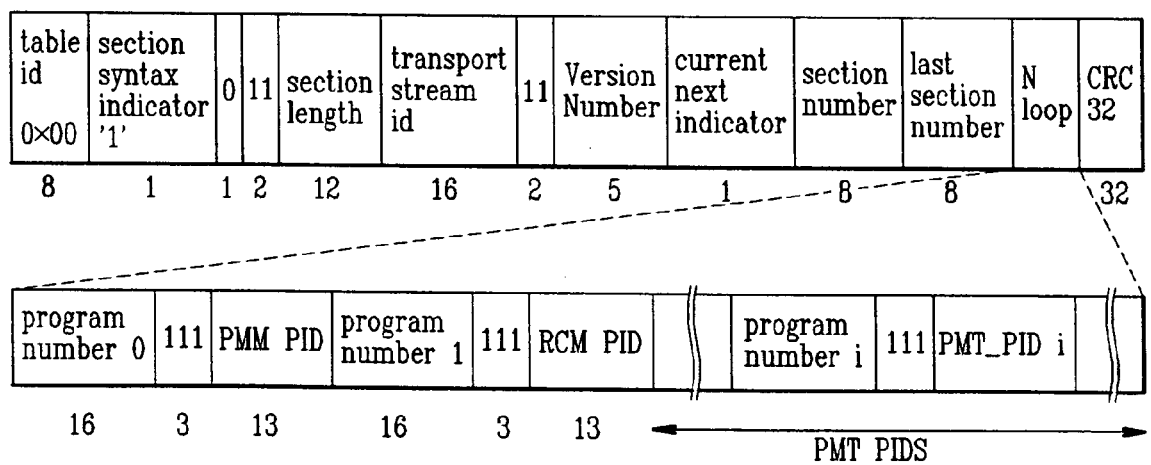
FIGS. 3a and 3b illustrates architectures of the PAT and the PMT in FIG. 2, respectively.
Figure 3B:
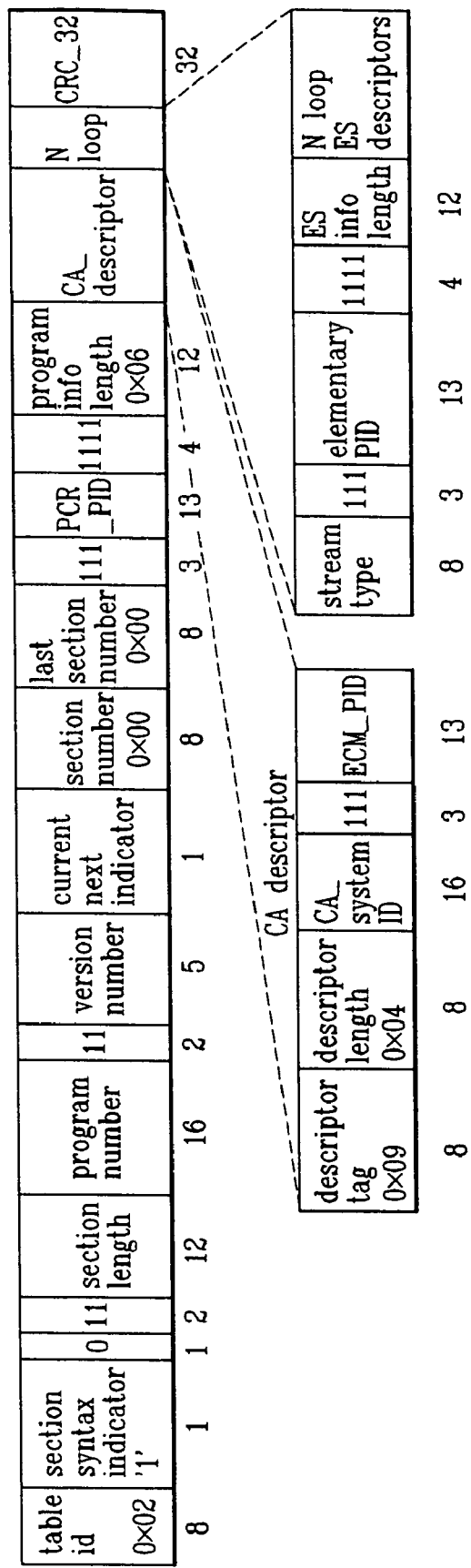
Figure 4:
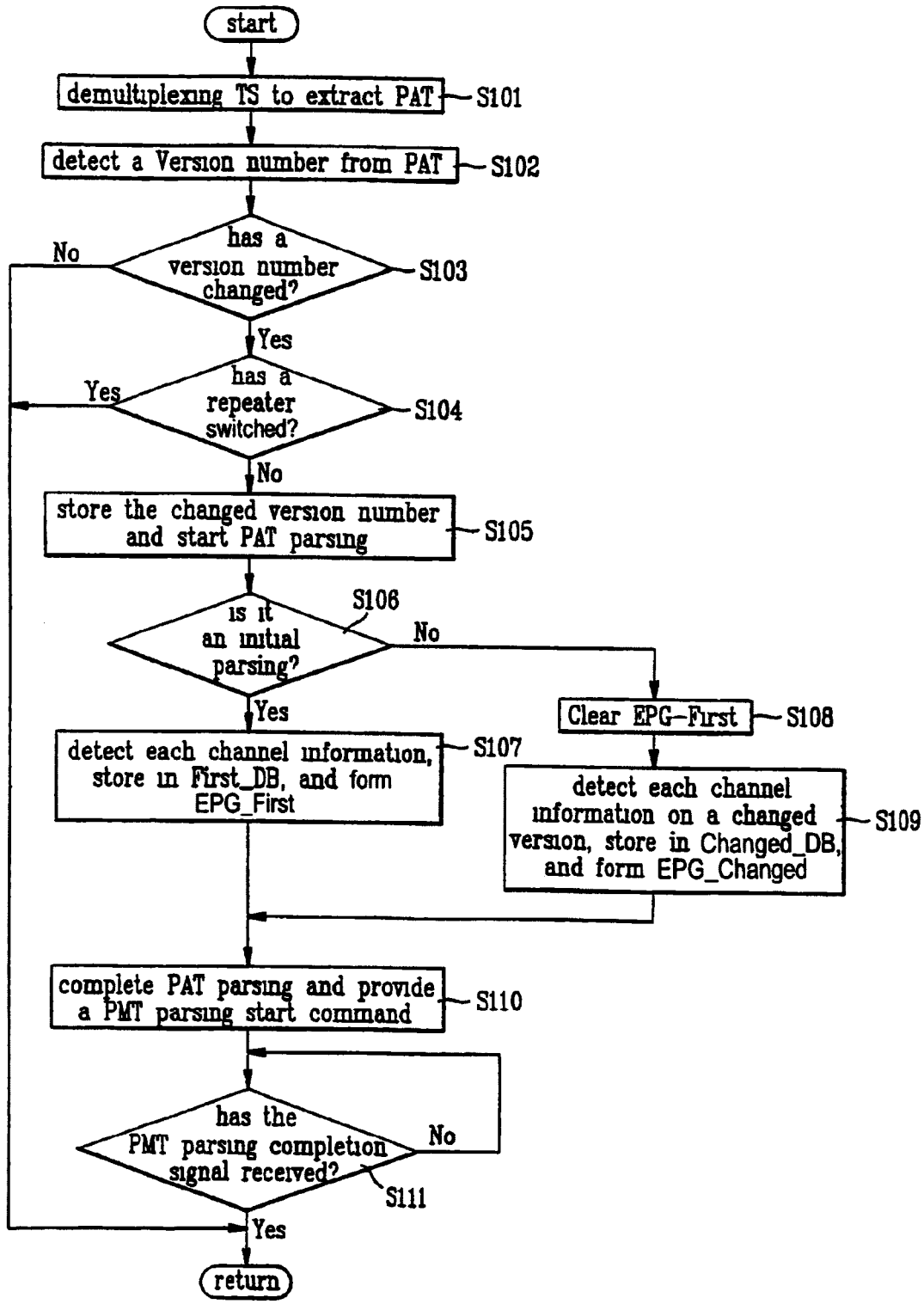
FIG. 4 illustrates flow chart showing the steps of a method for parsing a PAT in changing channel information in a digital TV receiver in accordance with a preferred embodiment of the present invention.

Reference will now be made in detail to the preferred embodiments of the present invention, examples of which are illustrated in the accompanying drawings. FIG. 4 illustrates flow chart showing the steps of a method for parsing a PAT in changing channel information in a digital TV receiver in accordance with a preferred embodiment of the present invention, FIG. 5 illustrates flow chart showing the steps of a method for parsing a PMT in changing channel information in a digital TV receiver in accordance with a preferred embodiment of the present invention, FIGS. 6a and 6b explain a method for checking canceled/added channel in FIG. 5, FIG. 7 illustrates an embodiment of algorithm for conducting the checking of canceled/added channel in FIG. 5, and FIG. 8 illustrates an embodiment of algorithm for adjusting the channel list in FIG. 6a.

The method for changing channel information in a digital TV receiver of the present invention is achieved by parsing PAT and PMT in the PSI information, which will be explained with reference to FIG. 4, because a version number in the PAT information is a criteria of a channel information change.

The method for changing channel information in a digital TV receiver of the present invention starts with demultiplexing a received transport stream at fixed intervals and extracting PATs therefrom (S101). Then, a version number is detected from the extracted PAT (S102), and it is determined whether the version number is changed or not (S103). If it is found that the version number is changed as a result of the determination (S103), it is determined whether the repeater is switched or not (S104). And, if the repeater is not switched, it is determined that the version number change comes from a channel information change. In this instance, if each repeater has its own transmission station, a new parsing is not required in a case a version change is caused by the switch of the repeater because there are cases when the version number change comes from difficulty in matching versions caused by different situation of the transmission station even if contents of the SI (Service Information) are identical. For example, in the case of Korean Mugungwha satellite, even if version numbers of the Mokdong transmission station and the Yongin transmission station are different, the SI information is the same. Therefore, as a result of the determination (S104), if it is found that the repeater is not switched, which implies that the SI is changed, the version number change is determined to be an actual channel information change, the changed version number is stored, and a PAT parsing is started (S105). Then, the PAT parsing conducted presently is determined of being an initial parsing (S106). As a result of the determination (S106), if it is found that the PAT parsing conducted presently is the initial PAT parsing, each channel information is detected, stored in First_DB, and forms EPG_First (S107). The First_DB is a memory for providing a data base of the initial PAT parsing channel information, and the EPG_First is a memory for storing a channel architecture, both are named by the inventor. As a result of the determination (S106), if it is found that the PAT parsing conducted presently is not the initial PAT parsing, the initial EPG_First is cleared (S108), each channel information of the change version is detected, stored in Changed_DB, and forms EPG_Changed (S109). In this instance, the Changed_DB is a memory for providing a data-base of the change channel information after the First_DB, and the EPG_Changed is a memory for storing change channel architecture after the EPG_First, which is named by the inventor. The subroutine (S107) or the subroutine (S109) is conducted, and a PMT start command is provided upon completion of the PAT parsing (S110). Then, the process stands by for reception of a PMT parsing completion signal, to return to the initial subroutine (S111).

A process of the PMT parsing will be explained with reference to FIG. 5.

Upon completion of the PAT parsing, the process stands by for reception of a PMT start command(S201). Upon reception of the PMT parsing start command, it is determined if the PMT parsing is an initial PMT parsing(S202). If it is found that the PMT parsing is the initial PMT parsing, PMT information is stored in the First_DB(S203), and a PMM information processing command is provided for providing a program specific information to a user(S204). Upon completion of the PMT parsing, a PMT parsing completion signal is provided(S207). If it is found that the PMT parsing is not the initial PMT parsing, as a result of the determination (S202), new PMT information is stored in Changed_DB, and EPG_First and EPG_Changed are compared, to check actually canceled or added channel(S205), and channel information update is executed, and the channel update is waited(S206).

Detail operation of the channel checking and updating will be explained.

Figure 6A:
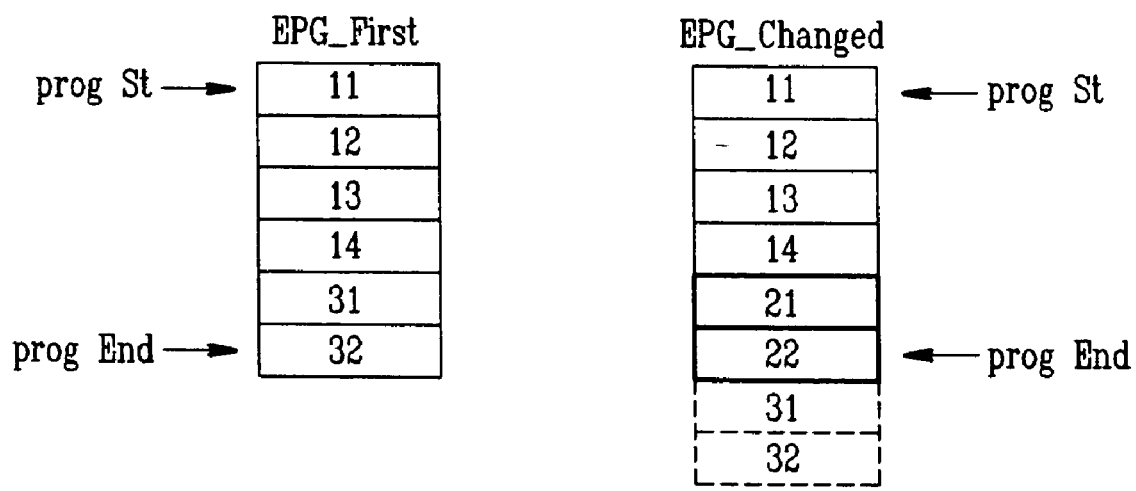
FIGS. 6a and 6b explain a method for checking canceled/added channel in FIG. 5.
Figure 6B:
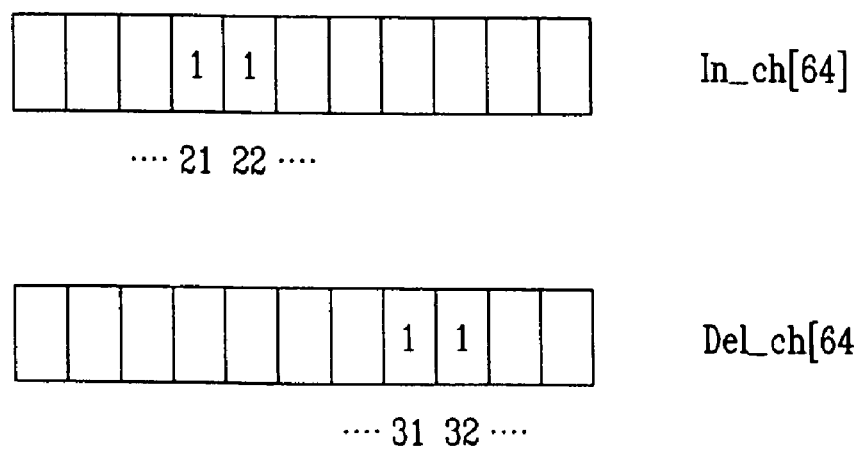

The channel check is conducted by comparing EPG_First and EPG_Changed as shown in FIG. 6a, and setting a pertinent memory in In_ch to '1' if there is an added channel and setting a pertinent memory in Del_ch to '1' if there is a canceled channel as shown in FIG. 6b, with a channel check algorithm shown in FIG. 7 applied thereto as one embodiment of the present invention. Upon completion of the channel check, channel update is conducted. In order to form a new channel connection architecture, the data base is re-arranged, and the data base is stored in EPG_First for being prepared for another channel change. And, because, in order to conduct the channel update, synchronization between independent processors should be matched for stabilizing a signal reception state, the channel update is conducted according to one embodiment of a channel connection architecture re-arrangement algorithm as shown in FIG. 8, for disconnecting connection to a canceled channel and connecting to an added channel, thereby updating channels. Upon completion of the channel update(S206), a PMT parsing completion signal is provided(S207).

Key points of the channel connection architecture re-arrangement algorithm are as follows.

First, upon completion of the channel cancellation or an additional check, a link structure is changed.

Second, no data base re-arrangement should be made, in which the link structure is changed, during an EIT parsing.

Third, no DB re-arrangement should be made during an Event Delete process proceeds, in which program is re-arranged at one hour intervals.

Fourth, the data base should be re-arranged when a channel watched presently is not included in canceled channels.

Thus, when the PMT parsing completion signal is provided upon completion of the PMT parsing, the PAT parsing at standby is started again to proceed the PAT parsing, to conduct the PAT and PMT parsing, thereby conducting a channel information change.

The method for changing channel information in a digital TV receiver of the present invention has the following advantages.

First, the conduction of PAT and PMT parsing based on channel information change known from version number and repeater switch reduces additional load on the controller, and the constant provision of a stable broadcasting program to users in response to channel information change possible to occur during broadcasting improves a reliability.

Second, the re-arrangement of channel connection architecture while matching synchronization between multi-processors facilitates stabilization of a system reception state.

It will be apparent to those skilled in the art that various modifications and variations can be made in the method for changing channel information in a digital TV receiver of the present invention without departing from the spirit or scope of the invention. Thus, it is intended that the present invention cover the modifications and variations of this invention provided they come within the scope of the appended claims and their equivalents.

What is claimed is:

1. A method for changing channel information in a digital TV receiver, the method comprising:
   determining changed channel information from a broadcasting signal received at preset time intervals and storing the changed channel information, wherein determining the changed information includes:
   determining whether a PMT parsing is an initial program map table (PMT) parsing;
   storing PMT information in a first database when the PMT parsing is the initial PMT parsing and storing changed PMT information in a second database when the PMT parsing is not the initial PMT parsing; and
   comparing the stored changed channel information and channel information stored already, for updating the channel information, wherein the comparing includes comparing a first channel list and a second channel list to determine added channels or canceled channels, and updating the channel information.

2. The method of claim 1, wherein the determining comprises determining a version change of the received broadcasting signal.

3. The method of claim 2, wherein determining the version change of the received broadcasting signal comprises:
   parsing PAT information from a transport stream; and
   checking a version number in the parsed PAT information to determine the version change.

4. The method of claim 1, further comprises determining whether a repeater has been switched if it is determined that the channel information is changed.

5. The method of claim 4, wherein determining whether the repeater has been switched comprises:
   storing the changed channel information when it is determined that the repeater is not switched; and
   maintaining existing channel information when it is determined that the repeater is switched.

6. The method of claim 1, wherein storing the changed information comprises:
   starting a program association table (PAT) parsing;
   determining whether the PAT parsing is the initial PAT parsing;
   storing each channel information in the first database to form the first channel list when it is determined that the PAT parsing is the initial PAT parsing; and
   clearing the first channel list, and storing the changed channel information in the second database, to form the second channel list, when it is determined that the PAT parsing is not the initial PAT parsing.

7. The method of claim 1, wherein the determining further comprises:
   storing the PMT information in the first database, and providing a PMT completion signal when the PMT parsing conducted presently is the initial PMT parsing and when the PMT parsing conducted presently is not the initial PMT parsing, storing the changed PMT information in the database; and
   providing a PMT completion signal.

8. The method of claim 1, wherein the determining further comprises providing a program guide message (PMM) information processing command after storing the PMT information in the first database.

9. A method for changing channel information in a digital TV receiver, the method comprising:
   storing a first channel list in a first database;
   determining, at preset time intervals, whether channel information has been changed by analyzing a received broadcast signal;
   storing a recent version of the channel information when it is determined that the channel information has been changed, wherein storing the recent version includes storing a second channel list in a second database; and
   updating the channel information by comparing the stored recent version of the channel information with a previous version of the channel information, wherein updating the channel information includes comparing the first channel list with the second channel list to determine added channels or canceled channels.

10. The method of claim 9, wherein determining whether the channel information has been changed comprises analyzing a version of the received broadcast signal.

11. The method of claim 10, wherein analyzing the version of the received broadcast signal comprises:
    parsing program association table (PAT) information from a transport stream; and
    checking the version number in the parsed PAT information to determine if the version of the received broadcast signal has changed.

12. The method of claim 10, wherein determining whether the channel information has changed further comprises determining if a repeater has been switched when it is determined that the version of the received broadcast signal has changed.

13. The method of claim 12, wherein determining whether the channel information has changed further comprises:
    determining that the channel information has changed when it is determined that the repeater has not been switched; and
    determining that the channel information has not changed when it is determined that the repeater has been switched.

14. The method of claim 9, wherein storing the recent version of the channel information comprises:
    starting a program association table (PAT) parsing;
    determining whether a present PAT parsing is an initial PAT parsing;
    storing information on each channel in the first database to form the first channel list when it is determined that the present PAT parsing is the initial PAT parsing; and
    clearing the first channel list, and storing the recent version of the channel information in the second database, to form the second channel list, when it is determined that the present PAT parsing is note the initial PAT parsing.

15. The method of claim 14, further comprising:
    providing a program map table (PMT) parsing start command upon completion of the PAT parsing;
    determining whether a present PMT parsing is an initial (PMT) parsing;
    storing PMT information in the first database, and providing a PMT completion signal when it is determined that the present PMT parsing is the initial PMT parsing;
    when it is determined that the present PMT parsing is not the initial PMT parsing, storing PMT information in the second database;
    updating the channel information upon completion of the comparison of the first channel list and the second channel list; and
    providing a PMT completion signal.

16. The method of claim 15, further comprising providing a program guide message (PMM) information processing command after storing the PMT information in the first database.

17. The method of claim 13, wherein storing the recent version of the channel information comprises:
storing the recent version of the channel information when it is determined that the channel information has changed; and
maintaining a previous version of the channel information when it is determined that the channel information has not changed.

18. A computer program embodied on a computer-readable medium for changing channel information in a digital TV receiver, wherein the computer program, when executed by a computer, performs a method comprising:
storing a first channel list in a first database;
determining, at preset time intervals, whether channel information has been changed by analyzing a received broadcast signal;
storing a recent version of the channel information when it is determined that the channel information has been changed, wherein storing the recent version includes storing a second channel list in a second database; and
updating the channel information by comparing the stored recent version of the channel information with a previous version of the channel information, wherein updating the channel information includes comparing the first channel list with the second channel list to determine added channels or canceled channels.

19. The computer program of claim 18, wherein determining, at the preset time intervals, whether the channel information has been changed comprises:
demultiplexing a transport stream to extract program association table (PAT) information;
reading a version number from the PAT information; and
determining if the read version number is different than a previous version number.

20. The computer program of claim 19, wherein the determining further comprises:
determining if a repeater has been switched;
determining that the channel information has been changed when the repeater has not been switched and the read version number is different than a previous version number; and
determining that channel information has not been changed when the repeater has been switched and the read version number is different than a previous version number.

21. The computer program of claim 18, wherein storing the recent version of the channel information when it is determined that the channel information has been changed comprises:
starting a program association table (PAT) parsing;
determining whether a present PAT parsing is the initial PAT parsing;
storing information on each channel in the first database to form the first channel list when it is determined that the present PAT parsing is the initial PAT parsing; and
clearing the first channel list, and storing the recent version of the channel information in the second database, to form the second channel list, when it is determined that the present PAT parsing is not the initial PAT parsing.

22. The computer program of claim 21, wherein updating the channel information comprises:
initiating a program map table (PMT) parsing;
determining whether a present PMT parsing is the initial (PMT) parsing;
storing PMT information in the first database, and providing a PMT completion signal when it is determined that the present PMT parsing is the initial PMT parsing;
when it is determined that the present PMT parsing is not the initial PMT parsing, storing PMT information in the second database;
updating the channel information upon completion of the comparison of the first channel list and the second channel list; and
providing a PMT completion signal.

23. The computer program of claim 22, wherein the method includes providing a program guide message (PMM) information processing command after storing the PMT information in the first database.

24. The method of claim 4, wherein the repeater comprises a repeater of a satellite broadcasting system.

25. The method of claim 1, wherein the changed PMT information stored in the second database includes changed channel information.

26. The method of claim 12, wherein the repeater comprises a repeater of a satellite broadcasting system.

27. The method of claim 9, wherein the recent version of the channel information stored in the second database includes changed channel information.

28. The computer program of claim 20, wherein the repeater comprises a repeater of a satellite broadcasting system.

29. The computer program of claim 18, wherein the recent version of the channel information stored in the second database includes changed channel information.

* * * * *